US012328232B2

(12) United States Patent
Sharma et al.

(10) Patent No.: US 12,328,232 B2
(45) Date of Patent: Jun. 10, 2025

(54) SYSTEM FOR AUTOMATED SELF-DISCOVERABLE GENERATION OF NETWORKED COMPUTING APPLICATION FLOWS

(71) Applicant: BANK OF AMERICA CORPORATION, Charlotte, NC (US)

(72) Inventors: Kamal D. Sharma, Mason, OH (US); Gilbert Gatchalian, Union, NJ (US); Kevin A. Delson, Woodland Hills, CA (US); Satya Veerabhadra Rao Iruku, Chesterfield, NJ (US); Noell York Eury, Charlotte, NC (US); Dhananjay Bhat, North Chelmsford, MA (US); Russ Ferguson, Brooklyn, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/234,617

(22) Filed: Aug. 16, 2023

(65) Prior Publication Data

US 2025/0062962 A1 Feb. 20, 2025

(51) Int. Cl.
*H04L 41/12* (2022.01)
*H04L 41/0816* (2022.01)
*H04L 41/22* (2022.01)

(52) U.S. Cl.
CPC .......... *H04L 41/12* (2013.01); *H04L 41/0816* (2013.01); *H04L 41/22* (2013.01)

(58) Field of Classification Search
CPC ...... H04L 41/0816; H04L 41/12; H04L 41/22
See application file for complete search history.

(56) References Cited

U.S. PATENT DOCUMENTS

| | | | |
|---|---|---|---|
| 9,124,650 | B2 | 9/2015 | Maharajh |
| 10,230,587 | B2 | 3/2019 | Cordray |
| 10,265,851 | B2 | 4/2019 | Skrinde |
| 10,419,288 | B2 | 9/2019 | Tofighbakhsh |
| 10,419,463 | B2 | 9/2019 | Muddu |
| 10,643,262 | B2 | 5/2020 | Bursey |
| 10,721,275 | B2 | 7/2020 | Kung |
| 10,728,119 | B2 | 7/2020 | Parandehgheibi |
| 10,769,056 | B2 | 9/2020 | Maliani |
| 11,222,298 | B2 | 1/2022 | Abelow |
| 11,297,109 | B2 | 4/2022 | Crabtree |

(Continued)

*Primary Examiner* — Gil H. Lee
(74) *Attorney, Agent, or Firm* — Moore & Van Allen PLLC; Nicholas C. Russell

(57) ABSTRACT

A system is provided for secure cross partition access and computing device recovery. In particular, the system may comprise a computing device that includes a non-transitory memory or storage device comprising one or more partitions. A user may attempt to log into the device and get locked out of the primary partition of the device after a threshold number of unsuccessful login attempts. The additional partitions of the computing device may store a portion of the authentication credential needed to access the primary partition and prompt the user using an item from the user data stored in a user-specific database. Upon detecting that the user has successfully accessed a threshold number of partitions and/or successfully provided responses to the prompts from a threshold number of partitions, the system may unlock and grant access to the locked partitions.

20 Claims, 5 Drawing Sheets

(56) References Cited

U.S. PATENT DOCUMENTS

| | | |
|---|---|---|
| 11,475,374 B2 | 10/2022 | Polleri |
| 11,588,857 B2 | 2/2023 | Kraning |
| 11,882,202 B2 | 1/2024 | Vijayadharan |
| 2020/0402144 A1 | 12/2020 | Cook |
| 2021/0105223 A1* | 4/2021 | Jutori .................... G06F 11/302 |
| 2021/0149466 A1 | 5/2021 | Raji |
| 2021/0226951 A1 | 7/2021 | Goldstein |
| 2021/0297432 A1 | 9/2021 | Hicks |
| 2022/0078081 A1 | 3/2022 | Mahdi |
| 2023/0195495 A1* | 6/2023 | Subramanian ........ G06F 9/5077 718/1 |
| 2023/0267374 A1 | 8/2023 | Polleri |
| 2023/0403731 A1 | 12/2023 | Sabella |
| 2024/0070494 A1 | 2/2024 | Polleri |

\* cited by examiner

SYSTEM FOR AUTOMATED SELF-DISCOVERABLE GENERATION OF NETWORKED COMPUTING APPLICATION FLOWS

TECHNOLOGICAL FIELD

Example embodiments of the present disclosure relate to a system for automated self-discoverable generation of networked computing application flows.

BACKGROUND

There is a need for a way to generate complex application flows.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for automated self-discoverable generation of networked computing application flows. In particular, the system may receive an initial input including one or more attributes, characteristics, and/or parameters associated with a computing application, such as critical endpoints of the application. The system may, through one or more application programming interfaces ("APIs"), receive data relating to each "node" or "hop" within the environment for the application flow. Based on such data, the system may generate a mapping of application flows across all of the relevant layers (e.g., application layer, network layer, and/or the like). The system may further dynamically detect any changes to the environment of the application and automatically update the mapping based on the changes. A visual representation of the mapping may then be presented to a user computing device. In this way, the system may provide an automated, end-to-end solution for generating mappings for application flows.

Accordingly, embodiments of the present disclosure provide a system for automated self-discoverable generation of networked computing application flows, the system comprising a processing device; a non-transitory storage device containing instructions when executed by the processing device, causes the processing device to perform the steps of receiving an application template associated with a target application, the application template comprising a location and one or more endpoints of the target application; based on the location and the one or more endpoints of the target application, automatically identifying one or more resources associated with the target application and one or more connections between the target application and the one or more resources; generating an application flow of the target application, the application flow comprising the location of the target application, the one or more endpoints, the one or more resources, and one or more connections between the target application and the one or more resources; and presenting the application flow on a user dashboard accessible by a user through a user computing device.

In some embodiments, generating the application flow of the target application comprises generating a computing layer specific perspective of the application flow for one or more layers, the one or more layers comprising at least one of an application layer, a network layer, and a hardware layer.

In some embodiments, the application flow is displayed as a composite topographical graph of the one or more layers within the user dashboard.

In some embodiments, the user dashboard comprises an interactable element configured to receive a user input to select a layer of the one or more layers, wherein the application flow is rearranged within the user dashboard based on the selection of the layer by the user.

In some embodiments, generating the application flow further comprises detecting a change in an environment of the target application; and dynamically updating the application flow based on the change.

In some embodiments, the change is at least one of a software update of the target application, addition of new resources, hardware upgrades, or removal of deprecated resources.

In some embodiments, the one or more resources comprises at least one of a hardware device, software library, database, supporting application, or process related to the target application.

Embodiments of the present disclosure also provide a computer program product for automated self-discoverable generation of networked computing application flows, the computer program product comprising a non-transitory computer-readable medium comprising code causing an apparatus to perform the steps of receiving an application template associated with a target application, the application template comprising a location and one or more endpoints of the target application; based on the location and the one or more endpoints of the target application, automatically identifying one or more resources associated with the target application and one or more connections between the target application and the one or more resources; generating an application flow of the target application, the application flow comprising the location of the target application, the one or more endpoints, the one or more resources, and the one or more connections between the target application and the one or more resources; and presenting the application flow on a user dashboard accessible by a user through a user computing device.

In some embodiments, generating the application flow of the target application comprises generating a computing layer specific perspective of the application flow for one or more layers, the one or more layers comprising at least one of an application layer, a network layer, and a hardware layer.

In some embodiments, the application flow is displayed as a composite topographical graph of the one or more layers within the user dashboard.

In some embodiments, the user dashboard comprises an interactable element configured to receive a user input to select a layer of the one or more layers, wherein the application flow is rearranged within the user dashboard based on the selection of the layer by the user.

In some embodiments, generating the application flow further comprises detecting a change in an environment of the target application; and dynamically updating the application flow based on the change.

In some embodiments, the change is at least one of a software update of the target application, addition of new resources, hardware upgrades, or removal of deprecated resources.

Embodiments of the present disclosure also provide a computer-implemented method for automated self-discoverable generation of networked computing application flows, the computer-implemented method comprising receiving an application template associated with a target application, the application template comprising a location and one or more endpoints of the target application; based on the location and the one or more endpoints of the target application, automatically identifying one or more resources associated with the target application and one or more connections between the target application and the one or more resources; generating an application flow of the target application, the application flow comprising the location of the target application, the one or more endpoints, the one or more resources, and the one or more connections between the target application and the one or more resources; and presenting the application flow on a user dashboard accessible by a user through a user computing device.

In some embodiments, generating the application flow of the target application comprises generating a computing layer specific perspective of the application flow for one or more layers, the one or more layers comprising at least one of an application layer, a network layer, and a hardware layer.

In some embodiments, the application flow is displayed as a composite topographical graph of the one or more layers within the user dashboard.

In some embodiments, the user dashboard comprises an interactable element configured to receive a user input to select a layer of the one or more layers, wherein the application flow is rearranged within the user dashboard based on the selection of the layer by the user.

In some embodiments, generating the application flow further comprises detecting a change in an environment of the target application; and dynamically updating the application flow based on the change.

In some embodiments, the change is at least one of a software update of the target application, addition of new resources, hardware upgrades, or removal of deprecated resources.

In some embodiments, the one or more resources comprises at least one of a hardware device, software library, database, supporting application, or process related to the target application.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
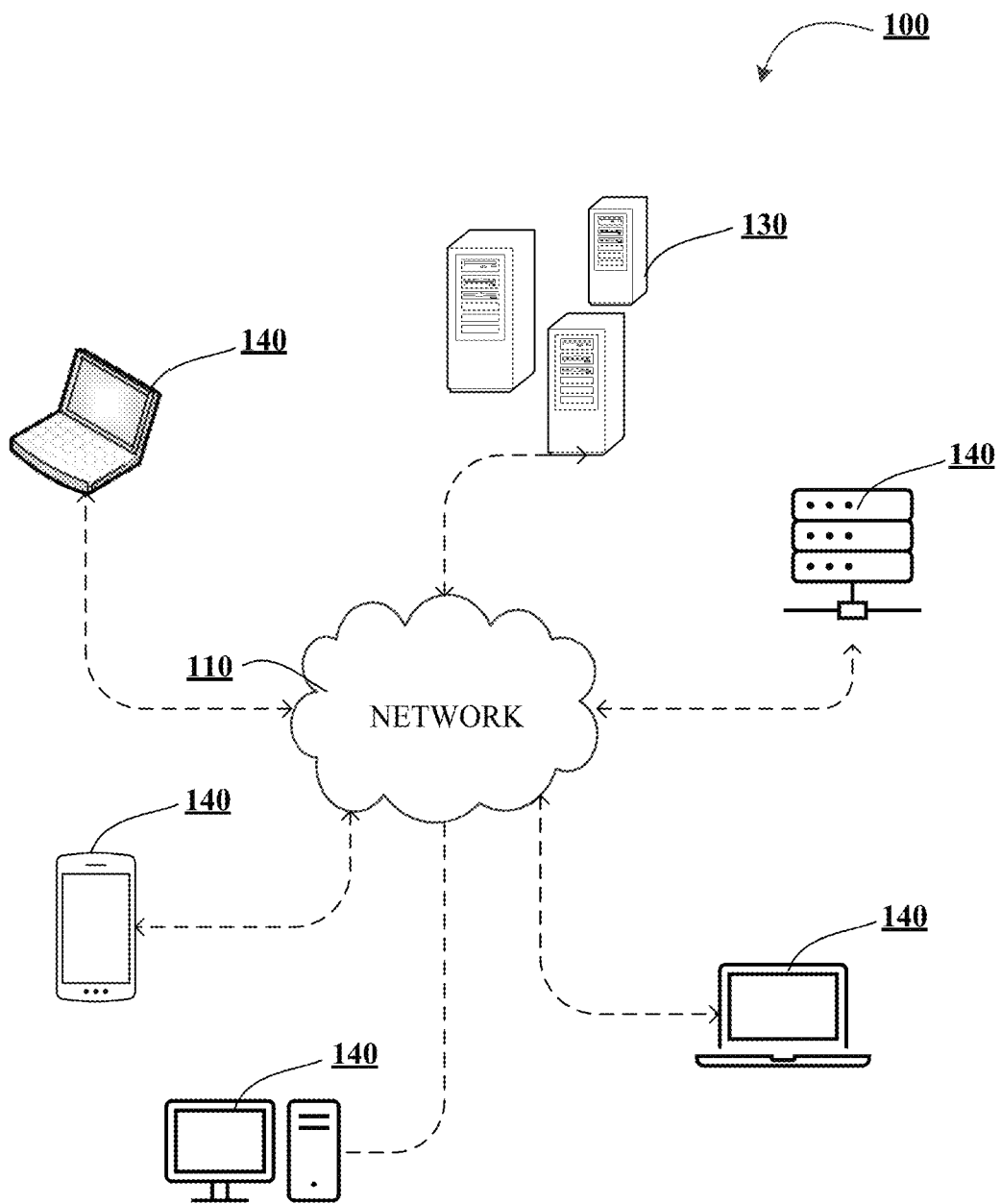
Figure 1B:
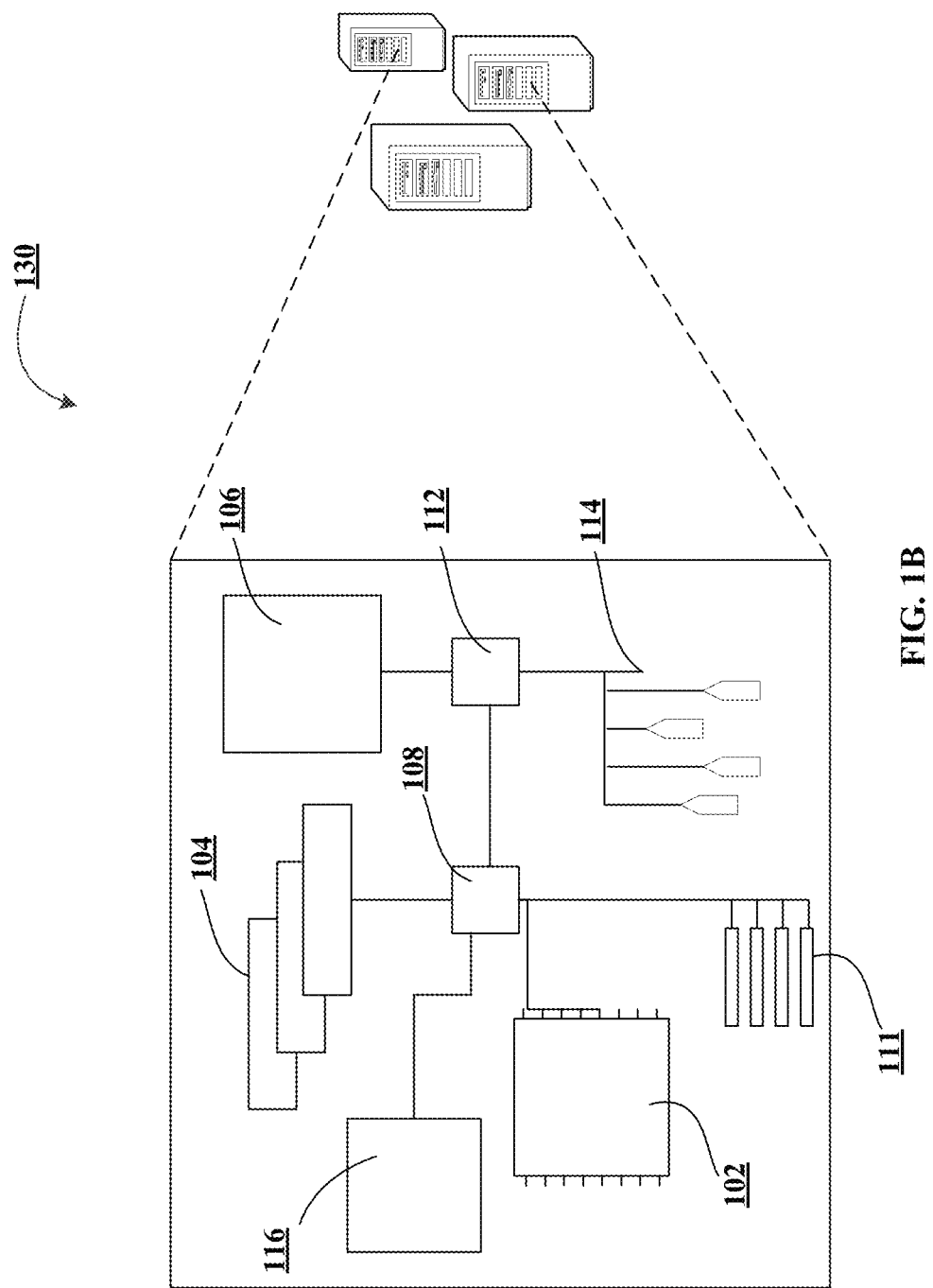
Figure 1C:
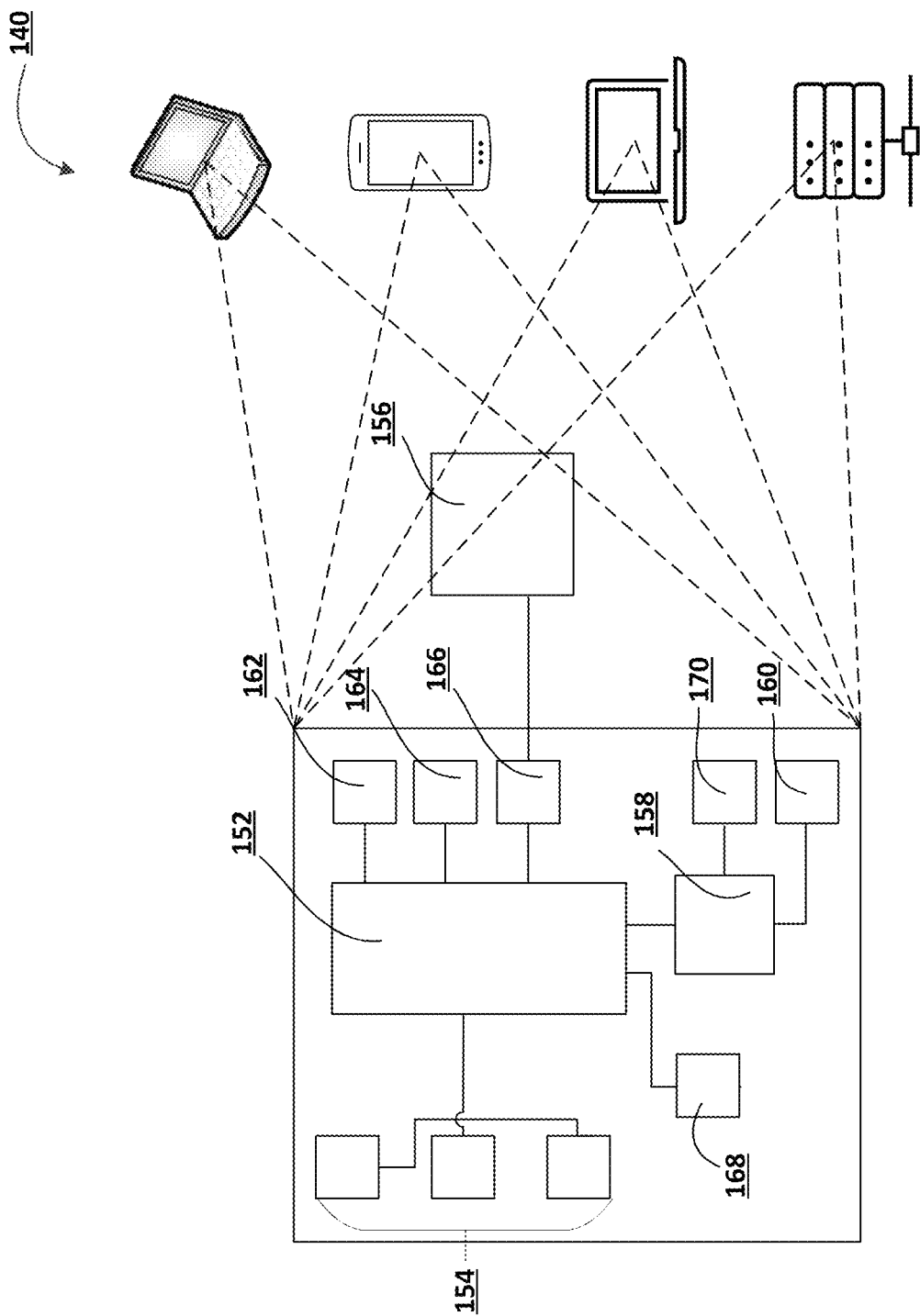
Figure 2:
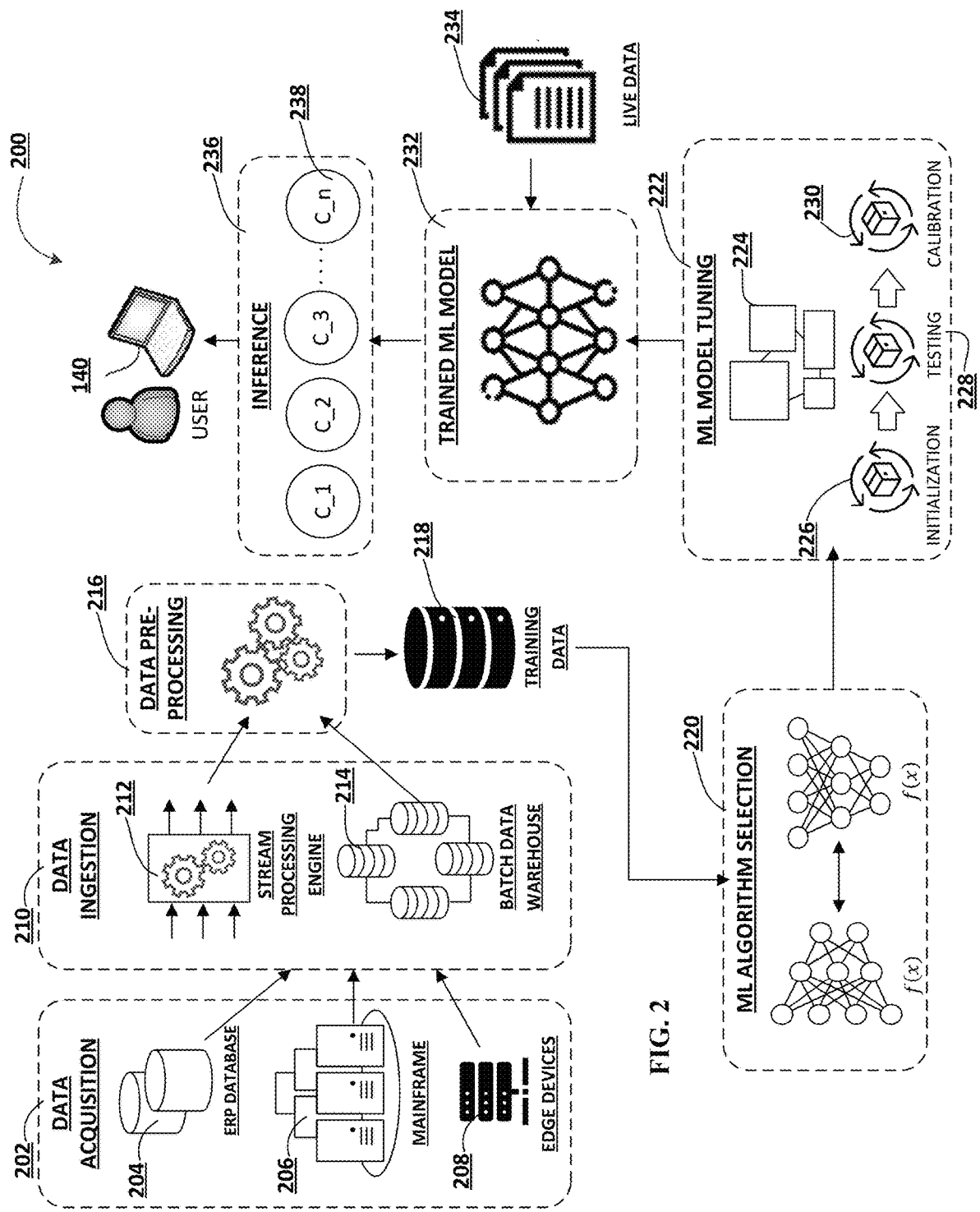
Figure 3:
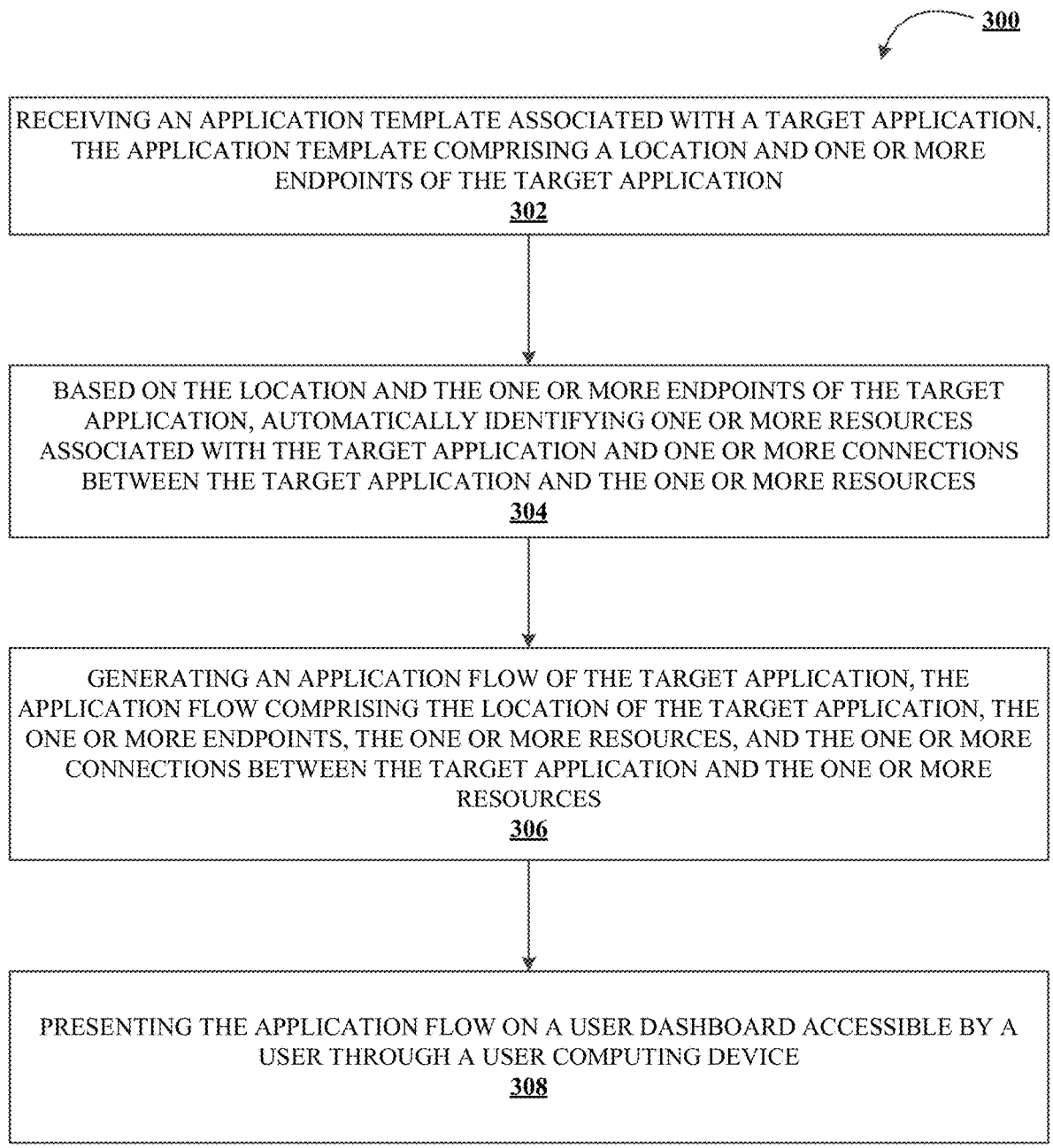

FIGS. 1A-1C illustrates technical components of an exemplary distributed computing system for automated self-discoverable generation of networked computing application flows, in accordance with an embodiment of the disclosure;

FIG. 2 illustrates an exemplary machine learning ("ML") subsystem architecture, in accordance with an embodiment of the disclosure; and FIG. 3 illustrates a method for automated self-discoverable generation of networked computing application flows, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like.

"Layer" as used herein may refer to a conceptual grouping to describe the computing resources, functions, and/or processes involved when computing systems communicate with one another (e.g., over a network). The computing resources, functions, and/or processes may include physical hardware devices (e.g., networking hubs or routers, network adapters, storage devices, communication interfaces, and/or the like) and/or software resources (e.g., applications, libraries, databases, configuration and/or definition files, and/or the like). Accordingly, in some embodiments, "layer" may refer to a layer within the Open Systems Interconnection ("OSI") Model, which may include a physical layer, data link layer, network layer, transport layer, session layer, presentation layer, application layer, and/or the like.

The increase in processing and networking capabilities in modern computing systems has been accompanied by a commensurate increase in computing application complexity. For instance, a computing application may have numerous components that may be stored in a distributed manner across various systems and/or devices, where each of the components may have interactions with various other components, resources, applications, and/or the like over a network. In such instances, the complexity of the application may be problematic when an issue arises with the application (e.g., application outage, performance issues, application errors, regressions or other bugs, broken or hindered application functionality, and/or the like). In particular, the lack of understanding of the multiple components and connections within application architecture may make it difficult for technical support teams to troubleshoot the application issues. Furthermore, existing architecture diagrams and materials may be incomplete or become outdated as applications and/or environments are updated and new connections and/or dependencies are introduced into the application flow. Accordingly, there is a need for an automated, intelligent way to generate computing application flows.

To address the above concerns among others, the system described herein provides a way to perform automated self-discoverable generation of networked computing application flows. In this regard, an entity's network environment may comprise one or more networked hardware devices, such as computing devices (e.g., desktop computers, servers, laptops, smart devices, and/or the like), networking devices (e.g., routers, switches, cabling, firewalls, communication/network interfaces, repeaters, and/or the like), and/or the like, which may host a number of software resources (e.g., applications, databases, libraries, drivers, and/or the like). The system may use one or more computing environment tools to identify and monitor the various devices and/or resources within the network environment, where such tools may include inventory management tools (e.g., network inventory tools, server inventory tools, database inventory tools, and/or the like), network monitoring tools (e.g., network and/or port scanners, network sniffers, query tools, testing tools, and/or the like), data crawlers, data feeds, and/or the like. Through the use of the tools as described herein, the system may generate a map of all of the computing resources that may be involved in a flow for an application (e.g., a target application) across all relevant layers.

To generate an application flow, the system may receive an initial input comprising a template of the target application, where the template may specify one or more endpoints of the application as well as the resources associated with each of the endpoints. For instance, a web-based application may retrieve and/or store information within a database hosted on a remote server (a first endpoint) and communicate with a user application such as a web browser running on a user computing device operated by an end user (a second endpoint). Upon receiving the inputs regarding the endpoints, the system may use the various tools described herein to identify the software and hardware components associated with each node, connection, hop, dependency, and/or the like (e.g., servers, API's, libraries, other applications, databases, and/or the like) associated with the endpoints. Based on the endpoints and the various connections, the system may dynamically generate an application flow that includes a detailed inventory of each layer of each node. In one embodiment, the system may determine the flow of data to and from the target application and/or the various components of the application through application data comprising embedded data tags that may cause the computing devices hosting the application data to transmit tracking data to the system when the application data is stored, received, and/or transmitted. In this way, the system may monitor, track, and log the flow of data using the embedded data tags. In some embodiments, the system may use other tools or sources of data, such as system logs, data sniffers, network or port sniffers, and/or the like. For instance, upon detecting an incoming connection to a computing device on port 443, the system may determine that the computing device is a web server.

In an exemplary embodiment, the system may determine which hardware devices, databases, applications, libraries, processes, and/or the like are used within a particular server. In addition, the system may map the various connections to the server over the network. For instance, the system may determine that five different applications depend on the server for the application data used to support the functionality of the applications. To this end, the system may analyze the running processes on the server to determine which applications, devices, resources, and/or the like have network interactions with the server. In some embodiments, the system may use a machine learning algorithm to intelligently identify the types of data and/or connections the various components have with one another within the application flow.

The application flow may comprise multiple views or perspectives of the application depending on which layer or layers are to be displayed. For instance, the application flow from the perspective of the hardware layer may show which hardware devices are connected with one another along with the nature of the relationships between the various hardware devices, where each hardware device may be expressed as a node with connections to other nodes. On the other hand, the application flow from the perspective of the application layer may show the other applications to which the target application is connected, where each application is expressed as a node. In this way, the system may generate an application flow that includes all of the relevant layers to the target application.

In some embodiments, the system may detect changes in the environment and/or nodes within the application flow. For instance, the application may be updated to pull data from an additional database or server, additional computing devices may be added to the distributed compute network for performing application workflows, certain libraries or dependencies may become deprecated and need to be removed, hardware devices may be upgraded and/or replaced, and/or the like. In this regard, the system may periodically query the various software and/or hardware components within the application flow to verify a status of the component. In other embodiments, the system may receive information from the components themselves and/or other data sources regarding the change. Based on the query and/or status change information, the system may update the application flows to reflect the current status of the components within the application flow. In this way, the system may provide a constantly up-to-date application flow for even highly complex applications.

The system may further comprise a user dashboard that may be accessible by a user through a user computing device. The user may be, for instance, a technical support specialist who may wish to view the application flow for the purpose of troubleshooting an issue with target application (e.g., broken functionality, application crashing or freezing, performance issues, and/or the like). In such a scenario, the user may log onto the user dashboard using a user computing device such as a desktop computer. The dashboard may comprise a visual flow diagram that may show the topology of the application flow, where the application and each of the connected resources may be expressed as nodes with one or more connections or relationships with one another (e.g., a graph diagram). The dashboard may comprise a selectable element that may filter the application flow based on the layers that the user may wish to see. For instance, the selectable element may be an interactable list, drop-down menu, and/or the like, which may allow the user to select one or more layers to view within the application flow. Accordingly, if the user selects the hardware layer, the application flow shown may indicate the various hardware devices and their interconnections that are associated with the target application. In some embodiments, the user may be able to select multiple layers such that the application flow displayed on the dashboard is a composite view comprising multiple layers. In this way, the system may provide the user with a complete view of the various components and/or resources involved within the application flow.

The system as described herein provides a number of technological benefits over conventional systems or tools for generating application flows. For instance, the system described herein may dynamically and automatically generate flows across all OSI layers, providing the user with a complete view of the various components and relationships of the target application. Furthermore, by automatically detecting changes within the application flow and updating the flows based on the changes, the system may provide up-to-date flows for complex applications that may have hundreds or thousands of connections, components, dependencies, and/or the like.

FIGS. 1A-1C illustrate technical components of an exemplary distributed computing environment 100 for the system for automated self-discoverable generation of networked computing application flows. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multiprocessor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102 (which may also be referred to herein as a "processing device"), memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1$, $C\_2$ . . . . $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2$ . . . . $C\_n$ 238) live data 234 based on how similar they are to one another to solve exploratory challenges where little is known about the data, provide a description or label (e.g., $C\_1$, $C\_2$ . . . . $C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a method 300 for automated self-discoverable generation of networked computing application flows, in accordance with an embodiment of the disclosure. As shown in block 302, the method includes receiving an application template associated with a target application, the application template comprising a location and one or more endpoints of the target application. In some embodiments, the application template may be received from a user, where the initial information regarding the target application may be inputted or selected by the user. In other embodiments, the system may automatically detect the presence of the application within a network environment and intelligently detect the locations and endpoints associated with the target application based on the various monitoring and detection tools described herein. The location of the target application may include information regarding the hardware, platform, and/or environment into which the target application is installed. Accordingly, the location may include an identifier of the hosting computing device (e.g., a hardware address), a location of the computing device within the network environment (e.g., a network address such as an IP address), operating system information, kernel and/or application version information, installed libraries, running processes, and/or the like.

The one or more endpoints of the target application may be key endpoints with respect to the functionality of the target application. For instance, if the target application is an application that interacts with a user or user application, the endpoint device associated with the user (e.g., a user computing device) may be designated as one of the endpoints of the target application. In other cases, such as when the target application is a backend application that may communicate with one or more backend servers through one or more application programming interfaces ("APIs"), each of the backend servers may be designated as one of the endpoints of the target application.

Next, as shown in block 304, the method includes, based on the location and the one or more endpoints of the target application, automatically identifying one or more resources associated with the target application and one or more connections between the target application and the one or more resources. In this regard, automatically identifying the one or more resources and one or more connections may comprise using one or more environment monitoring tools, the environment monitoring tools comprising, for instance, network scanners, port scanners, network sniffers, port sniffers, network query tools, data retrieval tools, secure communication channels, data tagging, and/or the like. In particular, in some embodiments, the system may monitor application data associated with an application, where the application data may have an embedded data tag. As the application data moves throughout the network environment through the various connections and nodes associated with the application flow, the system may monitor the application data using the embedded data tag, thereby allowing the system to discover all of the nodes or hops in route from the target application to the various endpoints. In this way, the identification of the resources and/or connections may include self-discovery of the various resources associated with the target application.

Next, as shown in block 306, the method includes generating an application flow of the target application, the application flow comprising the location of the target application, the one or more endpoints, the one or more resources, and the one or more connections between the target application and the one or more resources. Based on the various nodes and connections discovered during the automated scanning process, the system may generate a topological arrangement of the various nodes and connections, where the various resources and relationships between the resources may be expressed in as graph structures. In some embodiments, the system may generate multiple, layer-specific views or perspectives of the application flow. For instance, in some embodiments, the layers may include OSI layers, such as an application layer, network layer, hardware layer, and/or the like.

In some embodiments, generating the application flow may further comprise detecting a change in the network environment of the target application. The change may be, for instance, an update of the target application and/or one of the dependencies of the target application, a hardware upgrade, removal or isolation of a hardware or software resource, and/or the like. Upon detecting the change, the system may automatically update the application flow based on the detected change. In this way, the system may constantly provide updated application flows even without manual intervention.

Next, as shown in block 308, the method includes presenting the application flow on a user dashboard accessible by a user through a user computing device. In this regard, the dashboard may comprise a graphical user interface on which the application flow may be presented. In some embodiments, the application flow may be a composite topological graph that may be constructed based on multiple computing layers of the target application. The user dashboard may further comprise an interface element configured to receive a user input to select a layer-specific perspective for viewing the application flow. For instance, the user may wish to see all of the nodes and connections associated with the network layer of the target application. In such a scenario, the user may interact with the interface element to change the view of the application flow to show the relevant nodes and connections within the network layer. In this way, the system may provide a comprehensive view of the application flow across all computing layers associated with the target application.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for automated self-discoverable generation of networked computing application flows, the system comprising:
a processing device;
a non-transitory storage device containing instructions when executed by the processing device, causes the processing device to perform the steps of:
monitoring one or more computing devices associated with a target application using one or more computing environment tools;
receiving an application template associated with the target application, the application template comprising a location and one or more endpoints of the target application;
based on the location and the one or more endpoints of the target application, automatically identifying one or more resources associated with the target application and one or more connections between the target application and the one or more resources;
identifying a flow of data between the one or more endpoints by receiving tracking data from the one or more computing devices, wherein receiving the tracking data is based on monitoring an embedded data tag within application data associated with the target application that is processed by the one or more computing devices;

generating an application flow of the target application, the application flow comprising the location of the target application, the one or more endpoints, the one or more resources, and the one or more connections between the target application and the one or more resources; and presenting the application flow on a user dashboard accessible by a user through a user computing device.

2. The system of claim 1, wherein generating the application flow of the target application comprises generating a computing layer specific perspective of the application flow for one or more layers, the one or more layers comprising at least one of an application layer, a network layer, and a hardware layer.

3. The system of claim 2, wherein the application flow is displayed as a composite topographical graph of the one or more layers within the user dashboard.

4. The system of claim 3, wherein the user dashboard comprises an interactable element configured to receive a user input to select a layer of the one or more layers, wherein the application flow is rearranged within the user dashboard based on the selection of the layer by the user.

5. The system of claim 1, wherein generating the application flow further comprises:
    detecting a change in an environment of the target application; and
    dynamically updating the application flow based on the change.

6. The system of claim 5, wherein the change is at least one of a software update of the target application, addition of new resources, hardware upgrades, or removal of deprecated resources.

7. The system of claim 1, wherein the one or more resources comprises at least one of a hardware device, software library, database, supporting application, or process related to the target application.

8. A computer program product for automated self-discoverable generation of networked computing application flows, the computer program product comprising a non-transitory computer-readable medium comprising code causing an apparatus to perform the steps of:
    monitoring one or more computing devices associated with a target application using one or more computing environment tools;
    receiving an application template associated with the target application, the application template comprising a location and one or more endpoints of the target application;
    based on the location and the one or more endpoints of the target application, automatically identifying one or more resources associated with the target application and one or more connections between the target application and the one or more resources;
    identifying a flow of data between the one or more endpoints by receiving tracking data from the one or more computing devices, wherein receiving the tracking data is based on monitoring an embedded data tag within application data associated with the target application that is processed by the one or more computing devices;
    generating an application flow of the target application, the application flow comprising the location of the target application, the one or more endpoints, the one or more resources, and the one or more connections between the target application and the one or more resources; and
    presenting the application flow on a user dashboard accessible by a user through a user computing device.

9. The computer program product of claim 8, wherein generating the application flow of the target application comprises generating a computing layer specific perspective of the application flow for one or more layers, the one or more layers comprising at least one of an application layer, a network layer, and a hardware layer.

10. The computer program product of claim 9, wherein the application flow is displayed as a composite topographical graph of the one or more layers within the user dashboard.

11. The computer program product of claim 10, wherein the user dashboard comprises an interactable element configured to receive a user input to select a layer of the one or more layers, wherein the application flow is rearranged within the user dashboard based on the selection of the layer by the user.

12. The computer program product of claim 8, wherein generating the application flow further comprises:
    detecting a change in an environment of the target application; and
    dynamically updating the application flow based on the change.

13. The computer program product of claim 12, wherein the change is at least one of a software update of the target application, addition of new resources, hardware upgrades, or removal of deprecated resources.

14. A computer-implemented method for automated self-discoverable generation of networked computing application flows, the computer-implemented method comprising:
    monitoring one or more computing devices associated with a target application using one or more computing environment tools;
    receiving an application template associated with the target application, the application template comprising a location and one or more endpoints of the target application;
    based on the location and the one or more endpoints of the target application, automatically identifying one or more resources associated with the target application and one or more connections between the target application and the one or more resources;
    identifying a flow of data between the one or more endpoints by receiving tracking data from the one or more computing devices, wherein receiving the tracking data is based on monitoring an embedded data tag within application data associated with the target application that is processed by the one or more computing devices;
    generating an application flow of the target application, the application flow comprising the location of the target application, the one or more endpoints, the one or more resources, and the one or more connections between the target application and the one or more resources; and
    presenting the application flow on a user dashboard accessible by a user through a user computing device.

15. The computer-implemented method of claim 14, wherein generating the application flow of the target application comprises generating a computing layer specific perspective of the application flow for one or more layers, the one or more layers comprising at least one of an application layer, a network layer, and a hardware layer.

16. The computer-implemented method of claim 15, wherein the application flow is displayed as a composite topographical graph of the one or more layers within the user dashboard.

17. The computer-implemented method of claim 16, wherein the user dashboard comprises an interactable element configured to receive a user input to select a layer of the one or more layers, wherein the application flow is rearranged within the user dashboard based on the selection of the layer by the user.

18. The computer-implemented method of claim 14, wherein generating the application flow further comprises:
   detecting a change in an environment of the target application; and
   dynamically updating the application flow based on the change.

19. The computer-implemented method of claim 18, wherein the change is at least one of a software update of the target application, addition of new resources, hardware upgrades, or removal of deprecated resources.

20. The computer-implemented method of claim 14, wherein the one or more resources comprises at least one of a hardware device, software library, database, supporting application, or process related to the target application.

* * * * *